United States Patent [19]
Inoue

[11] Patent Number: 5,831,599
[45] Date of Patent: Nov. 3, 1998

[54] COORDINATE INPUT APPARATUS

[75] Inventor: Kinya Inoue, Iwaki, Japan

[73] Assignee: Alps Electric Co., Ltd., Japan

[21] Appl. No.: 689,161

[22] Filed: Aug. 5, 1996

Related U.S. Application Data

[63] Continuation of Ser. No. 288,633, Aug. 10, 1994, abandoned.

[30]     Foreign Application Priority Data

Aug. 31, 1993  [JP]  Japan .................................. 5-238991

[51] Int. Cl.$^6$ ....................................................... G09G 5/00
[52] U.S. Cl. ........................................... 345/173; 345/174
[58] Field of Search ................................... 345/173, 174,
345/176, 178, 182, 157, 145, 146, 162,
156, 179, 104; 178/18, 19

[56]             References Cited

U.S. PATENT DOCUMENTS

| | | | |
|---|---|---|---|
| 4,600,807 | 7/1986 | Kable | 345/173 |
| 4,728,945 | 3/1988 | Kojima | 345/157 |
| 4,737,773 | 4/1988 | Kobayashi | 345/173 |
| 4,893,115 | 1/1990 | Blanchard | 345/174 |
| 4,929,934 | 5/1990 | Ueda et al. | |
| 5,451,724 | 9/1995 | Nakazawa et al. | 345/173 |
| 5,527,163 | 6/1996 | Hashimoto | 345/173 |

*Primary Examiner*—Xiao Wu
*Attorney, Agent, or Firm*—Brinks Hofer Gilson & Lione

[57]             ABSTRACT

A coordinate input apparatus capable of preventing inaccurate detection of a position caused by chattering or a disturbed timing, thereby ensuring accurate detection of a position. Open check for determining whether the resistance of contact between a first resistive film and a second resistive film exceeds a preset value for a predetermined time is carried out before and after obtaining a signal of an X-coordinate position and also before and after obtaining a signal of a Y-coordinate position. In addition, there is provided a processing circuit, which detects the signals from tablet electrodes for multiple times within a predetermined time to obtain the position signals, converts them into digital values, calculates the difference between the values, and performs arithmetic processing and output only if the difference is a reference value or less.

2 Claims, 6 Drawing Sheets

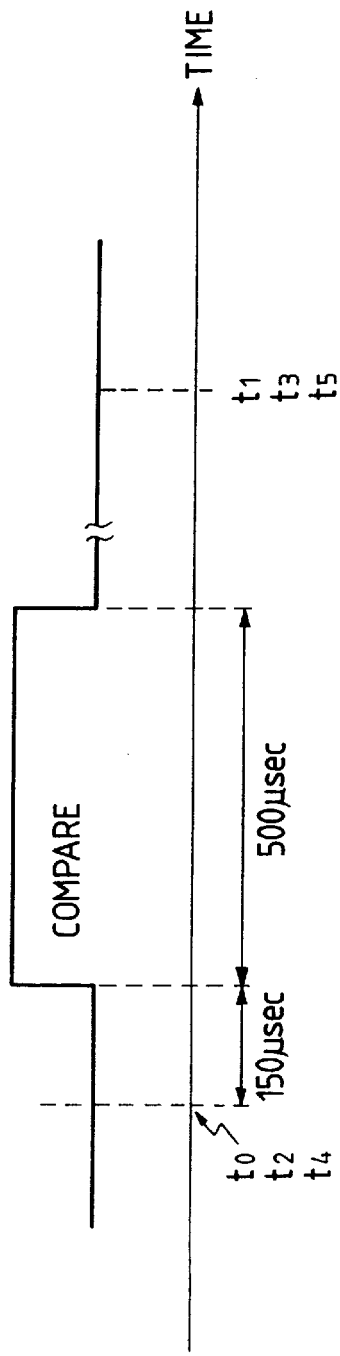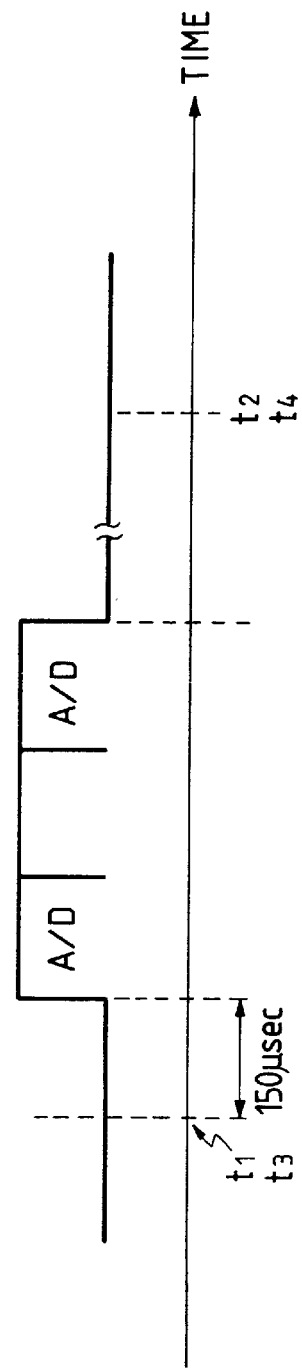

000

COORDINATE INPUT APPARATUS

This application is a continuation application Ser. No. 08/288,633 filed Aug. 10, 1994, now abandoned.

BACKGROUND OF THE INVENTION

1. Field of the Invention

The present invention relates to a coordinate input apparatus for entering handwritten texts, patterns, etc. into a computer by detecting a coordinate position where an input pen is located.

2. Description of the Related Art

Conventionally, a voltage-dividing type tablet employing resistive films shown in FIG. 8 is known as an input device for entering handwritten texts, patterns, etc. This tablet has resistive films 11, 12, which are applied or evaporated onto opposing surfaces of two insulating films, a plurality of insulating dot spacers 13 being provided between the resistive film 11 and the resistive film 12 to space the resistive film 11 away from the resistive film 12 by a predetermined distance. Two opposing sides of the resistive film 11 are provided with electrodes 11a, 11b, while two sides of the resistive film 12, which are orthogonal with respect to the electrodes 11a, 11b, are provided with electrodes 12a, 12b.

The position of a point depressed in the tablet is detected in such a manner that a processing circuit 14, not shown, alternately applies a DC voltage to the electrodes 11a, 11b and the electrodes 12a, 12b in a time-sharing mode and it detects the voltage through the electrodes of the resistive film, to which no voltage is being applied, thereby detecting the positions in the respective directions.

For instance, when point P in FIG. 8 is depressed, in order to detect an X-coordinate direction thereof, the processing circuit first applies a DC voltage E (V) to the electrode 11a and 0 (V) to the electrode 11b. This causes a divided voltage at point P of the resistive film 11 to be applied to the resistive film 12, which is in contact at point P, and the voltage is detected through the electrodes 12a, 12b of the resistive film 12, thus making it possible to determine the coordinate.

Likewise, when detecting a Y-coordinate direction, the processing circuit first applies the DC voltage E (V) to the electrode 12a and 0 (V) to the electrode 12b. This causes the divided voltage at point P of the resistive film 12 to be applied to the resistive film 11, which is in contact at point P, and this voltage is detected through the electrodes 11a, 11b of the resistive film 11, thus allowing the coordinate to be determined.

The detecting method in the tablet, which employs the aforesaid configuration, occasionally detects a voltage when there is not adequate contact between the two resistive films, thus preventing accurate coordinate detection. In addition, chattering, which takes place when the electrodes contact, sometimes leads to inaccurate coordinate detection.

SUMMARY OF THE INVENTION

Accordingly, it is an object of the present invention to provide a coordinate input device, which is capable of preventing such inaccurate detection of a position and ensuring accurate detection of a position.

It is another object of the present invention to permit easy coordinate correction, which can be completed simply by pressing cursors which appear at corners of a screen; and it is still another object to improve ease of operation by saving coordinate data on depression in an EPROM, thereby eliminating the need of correcting the coordinates each time the operation is started.

It is yet another object of the present invention to improve ease of operation by providing the selection of operation modes, thereby permitting easy selection between the X- and Y-coordinates, the position of the origin of the coordinates, and the full-scale coordinates of the X- and Y-coordinates of the apparatus.

The coordinate input apparatus according to the present invention has a top substrate, which has a first resistive film formed on one surface thereof and which is provided with a pair of first electrodes on two edges of the resistive film, a bottom substrate, which has a second resistive film formed on one surface thereof, the second resistive film facing against the first resistive film, and which is provided with a pair of second electrodes disposed orthogonally with respect to the aforesaid electrodes, a spacer for spacing the foregoing first resistive film away from the second resistive film, and a determining means for deciding whether the resistance value of the contact between the foregoing first and second resistive films exceeds a preset value for a predetermined time. A position signal of a first direction is obtained and the foregoing determining means determines whether the position signal of the first direction should be accepted or not. Likewise, a position signal of a second direction is obtained and the determining means determines again whether the position signal of the second direction should be accepted or not. Then coordinate calculation is performed based on the two position signals when it has been decided that the position signals of the first and second directions are acceptable.

Further, the coordinate input apparatus according to the present invention has a correction display means, which displays a first cursor to be the minimum coordinates of the X- and Y-coordinates at a corner of the screen, and which also displays a second cursor to be the maximum coordinates of the X- and Y-coordinates at a corner on a diagonal line with respect to the foregoing corner, and a calculating means for calculating computational reference value data for the X- and Y-coordinates from a difference between the maximum X- and Y-coordinates and the minimum X- and Y-coordinates. The computational reference value data of the X- and Y-coordinates is calculated by pressing the first cursor and pressing the second cursor, thus performing a coordinate correction.

Furthermore, the coordinate input apparatus according to the present invention is provided with a controller, which calculates the position of a point depressed in terms of the X- and Y-coordinates and an operation mode selecting means connected to the controller. The selecting means is used to switch between an X-coordinate axis and a Y-coordinate axis according to horizontal or vertical installation, and the selecting means has a point of intersection of the X-coordinate axis and the Y-coordinate axis, the point serving as the coordinate origin, thus making the coordinate position of the origin selectable. The selecting means also allows the full-scale coordinates of the X- and Y-coordinates to be selectable.

In the configuration described above, it is confirmed that both resistive films are in good contact, then the signal of the position in the first direction is obtained; the two resistive films are checked for adequate contact again before the signal of the position in the second direction is obtained; and the two resistive films are checked for good contact again before calculating the positional coordinates from the obtained first and second direction data and outputting the result. Thus, the coordinate calculation and the output can be carried out based only on the data obtained from a point, which is kept depressed throughout the detection, thereby preventing inaccurate detection caused by chattering or a disturbed timing.

Moreover, in obtaining the position signals, only when the difference between obtained signal digital values is the reference value or less, the calculation and output are carried out based on the digital values. This ensures that the calculation and output based on the signals are performed in a stable condition, thus achieving highly accurate detection of positions.

BRIEF DESCRIPTION OF THE DRAWINGS

FIG. 4 is a timing chart of an open check operation of the processing circuit according to the present invention;

FIG. 5 is a timing chart of a positional data detection operation of the processing circuit according to the present invention;

DESCRIPTION OF THE PREFERRED EMBODIMENT

The following describes an embodiment of the present invention with reference to the attached drawings.

Figure 1:
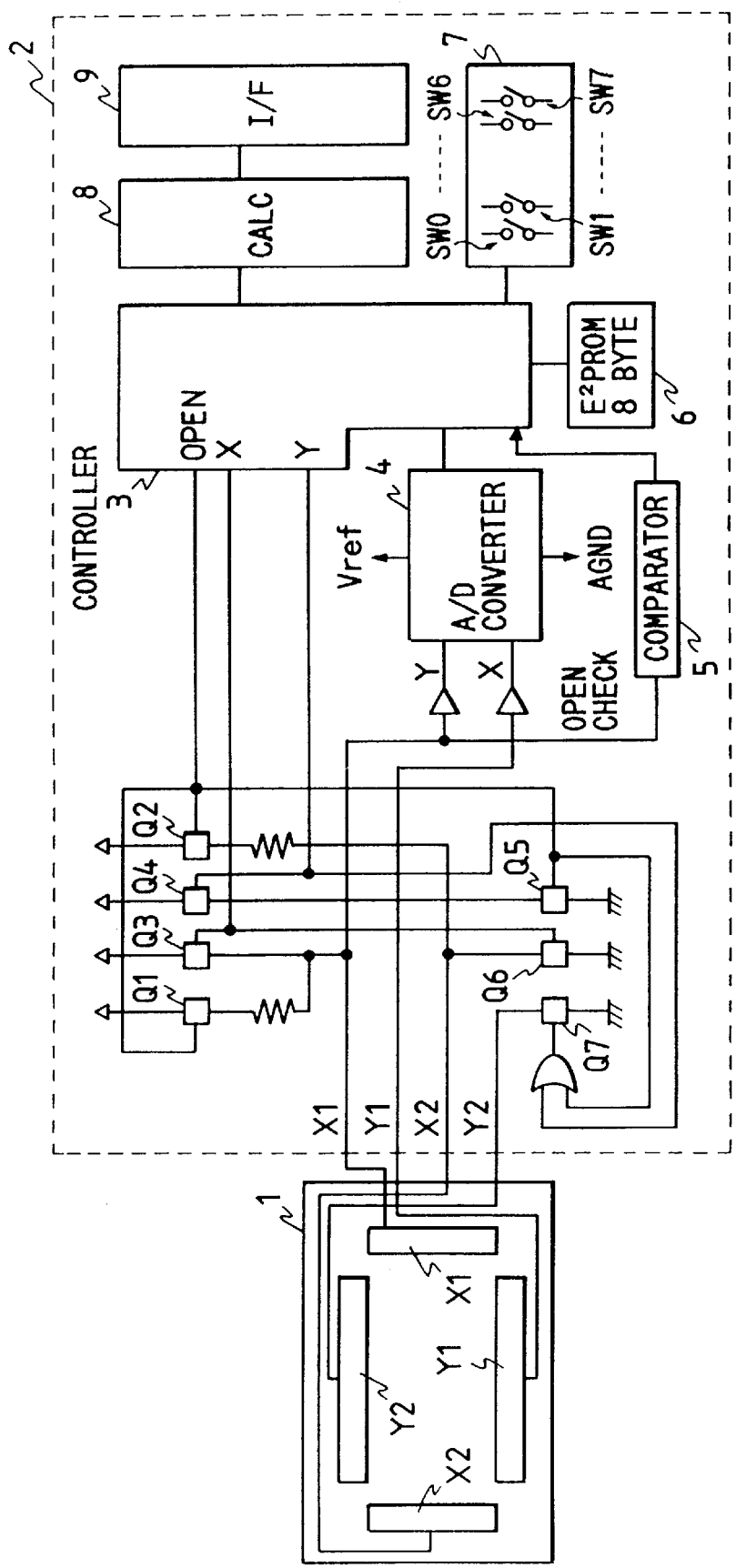
FIG. 1 is a block diagram of a data processing circuit according to the present invention.

FIG. 1 is a block diagram of the data processing circuit according to the present invention. The data processing circuit includes a tablet 1, which has resistive films printed on the opposing surfaces of two PET sheets. Reference characters X1, X2 indicate the electrodes evaporated on one of the resistive films, while Y1, Y2 indicate the electrodes evaporated on the other resistive film.

The data processor further includes a processing circuit 2, which detects a position where the tablet 1 is being operated and outputs the positional coordinate thereof to upper-level information processing equipment, the processing circuit 2 being connected to the electrodes X1, X2 and Y1, Y2 of the tablet 1, a controller 3, which controls the signals of the four electrodes X1, X2, Y1, and Y2, and transistors Q1 through Q7, which serve as switches working in response to outputs from the controller 3. The data processor further includes an analog-digital converter 4, which is connected to the electrodes X1, Y1 and the controller 3, a comparator 5 connected to the electrode X1 and the controller 3, an EPROM 6, which is connected to the controller and which stores preset values or the like, a DIP switch 7 consisting of eight switches, SW1 through SW8, which are connected to the controller 3 and which set the operation mode of the controller 3, a calculating block 8, which is connected to the controller 3 and which conducts arithmetic processing on the signals received from the controller 3, and an interface 9 for outputting the position data calculated by the calculating block 8 to upper-level information processing equipment.

The operation mode selected by the individual switches of the DIP switch 7 will now be described.

The selector switch SW0 is used for switching between vertical installation and horizontal installation; SW0 is set to 0 for horizontal installation with the electrodes X1, X2 arranged horizontally and the electrodes Y1, Y2 arranged vertically, while SW0 is set to 1 for vertical installation with the electrodes Y1, Y2 arranged horizontally, and the electrodes X1, X2 arranged vertically.

The selector switches SW1 and SW2 are used to select the origin. Setting (SW1, SW2) to (0, 0) establishes the origin at a point of intersection of the extended lines of the electrode Y1 and the electrode X1. Setting them to (0, 1) places the origin at a point of intersection of the electrode X1 and the electrode Y2. Setting them to (1, 0) fixes the origin at a point of intersection of the electrode Y2 and the electrode X2. Setting them to (1, 1) establishes the origin at a point of intersection of the electrode X2 and the electrode Y1.

The selector switch SW3 selects the transfer speed of data transmitted from the interface 9 to the upper-level information equipment. Setting SW3 to 0 sets the transfer speed to 9600 BPS, while setting it to 1 sets the transfer speed to 19200 BPS.

The selector switch SW4 selects the full-scale coordinate system. Setting SW4 to 0 sets the input surface to 1024 dots by 1024 dots, while setting it to 1 sets the input surface to 4092 dots by 3069 dots.

The selector switches SW5 and SW6 select the reading speed. Setting (SW5, SW6) to (0, 0) sets the reading speed to 200 cpps (coordinate pairs per second); setting it to (0, 1) sets the speed to 100 cpps; setting it to (1, 0) sets the speed to 67 cpps; and setting it to (1, 1) sets the speed to 50 cpps.

The selector switch SW7 selects the interface. Setting SW7 to 0 sets for outputs through a serial interface, while setting it to 1 sets for outputs through a parallel interface.

The operation of the processing circuit 2 will now be described.

Figure 2:
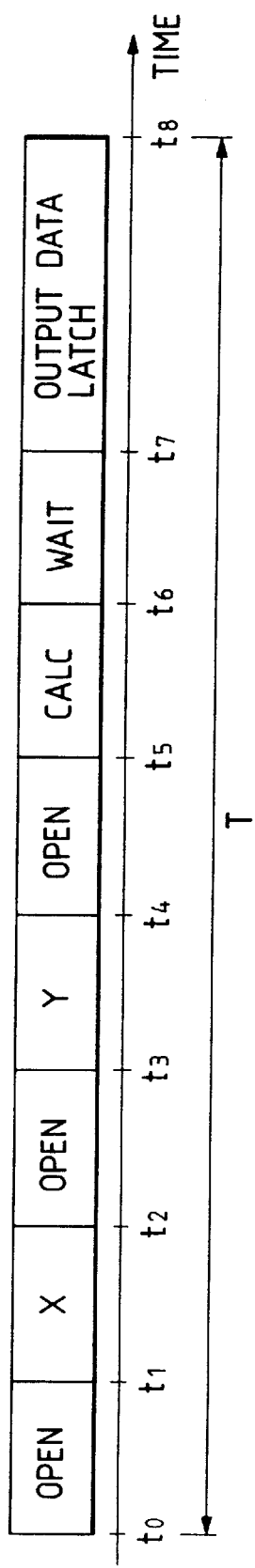
FIG. 2 is an operation timing chart of a processing circuit according to the present invention.

FIG. 2 shows an operation timing of the processing circuit; it shows the processing carried out during a cycle T, which extends from the moment a positional coordinate of a point is detected to the moment the data thereof is output. The cycle T differs, depending on the setting of SW5 and SW6 of the DIP switch 7; it is 5 ms for 200 cpps or 20 ms for 50 cpps.

During a period from t0 to t1 in FIG. 2, the transistors Q1, Q2, Q5, and Q7 are turned ON and the comparator 5 determines if the two resistive films are in adequate contact (open check). During a period from t1 to t2, the transistors Q3 and Q6 are turned ON and the A/D converter 4 detects the positional data in the X-coordinate direction. During a period from t2 to t3, open check is conducted again, and during a period from t3 to t4, the transistors Q4 and Q7 are turned ON and the A/D converter 4 detects the positional data in the Y-coordinate direction. During a period from t4 to t5, open check is performed again, then during a period from t5 to t6, the positional coordinates are calculated from the detection data on the X- and Y-coordinate directions. After waiting until t7, an output is given during a period from t7 to t8.

Figure 3:
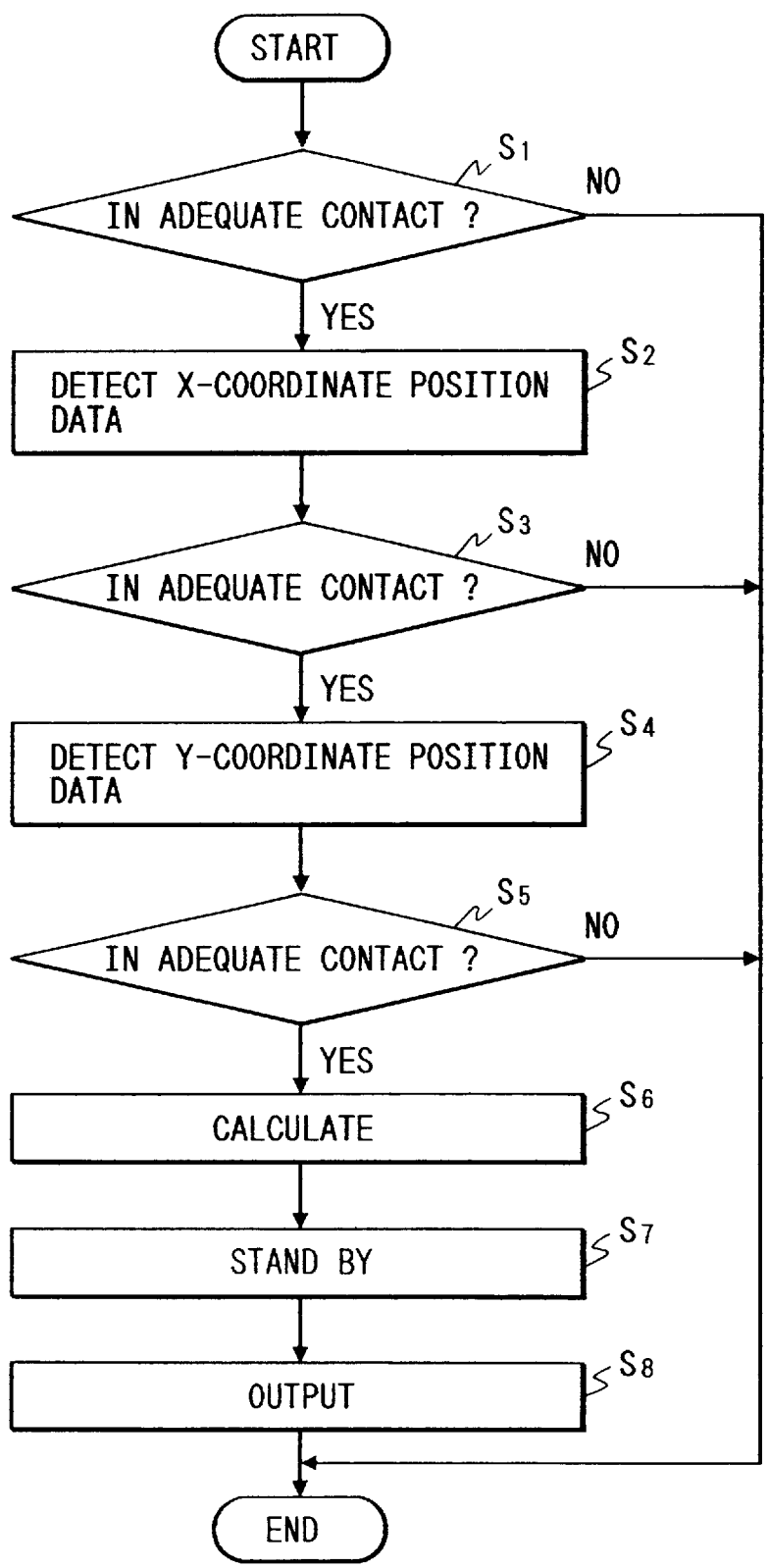
FIG. 3 is a flowchart of the operation of the processing circuit according to the present invention.

FIG. 3 is a flowchart of the operation of the processing circuit 2.

In a step s1, it is determined whether the two resistive films are in adequate contact or not (open check). If it is determined that the two resistive films are in adequate contact ("Yes" in the step s1), then the positional data in the X-coordinate direction is detected (step s2). Then, open check is conducted again (step s3) and if it is determined that the resistive films are in good contact ("Yes" in the step s3), then the positional data in the Y-coordinate direction is detected (step s4). Open check is carried out again (step s5) and if it is determined again that the resistive films are in adequate contact ("Yes" in the step s5), then arithmetic processing is performed based on the positional data detected in the step s2 and the step s4 (step s6). After waiting for timing adjustment (step s7), the result of the arithmetic processing is sent to the upper-level information processing equipment (step s8). If it is determined that there is no adequate contact in the step s1, s3 or s5 ("No" in the step s1, "No" in the step s3 or "No" in the step s5), then the system is placed in a wait state until the end of the cycle from that moment, thereby preventing any data output from being given.

FIG. 4 gives a detailed illustration of the open check shown in the operation timing chart of FIG. 2 (the steps s1, s3, and s5 of FIG. 3). In the open check procedure, the system waits for 150 μs from t0, t2, and t4, then during a period of 500 μs from those points, the comparator 5 compares the contact resistance with a preset value (e.g., 1.5 kΩ). If the contact resistance always exceeds the preset value, then it is determined that the resistive films are in adequate contact.

FIG. 5 gives a detailed illustration of the detection of the positional data on the X- and Y-coordinate directions (the step s2 of FIG. 3) in the operation timing chart of FIG. 2. The system waits for 150 μs from t1 and t3, then during a period of 500 μs from those points, electrode signals are detected twice, and the values are converted into digital values by the A/D converter 4. Only when the difference between the two digital values is 2/1024 dots or less, the data is taken in.

Figure 6:
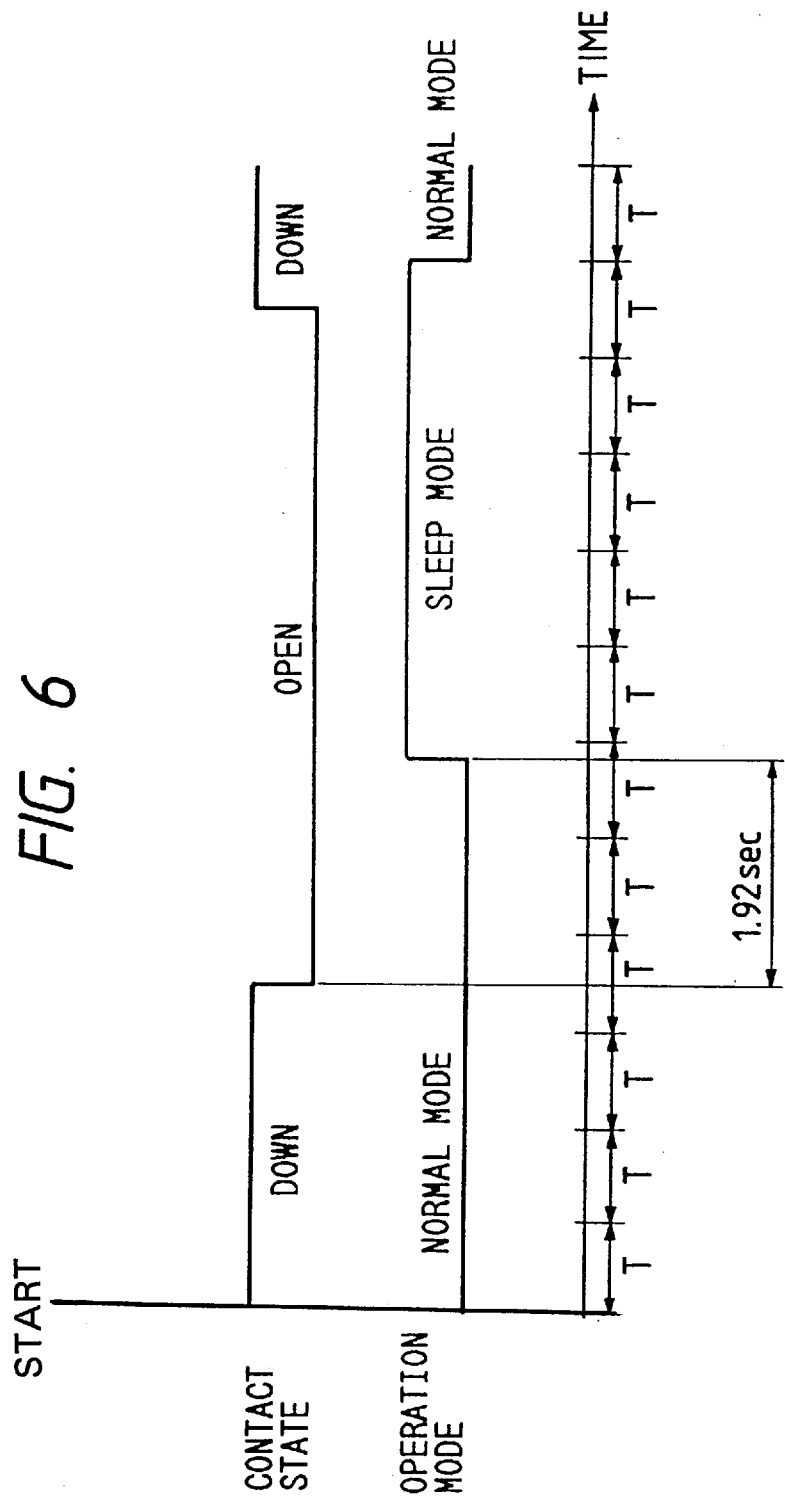
FIG. 6 is a timing chart of the processing circuit of the present invention shifting into a sleep mode.

FIG. 6 shows the processing circuit shifting into a sleep mode and exiting the sleep mode. During the open check, if the open state, wherein the two resistive films are not in contact for a given time (e.g., 1.92 seconds), continues, the processing circuit shifts into the sleep mode. In this sleep mode, the comparator 5 always stands by in the open check state and the functions other than the comparator 5 are suspended to reduce the waste of electric power. When an input is given, the comparator 5 causes the processing circuit to go back to the normal mode.

Figure 7:
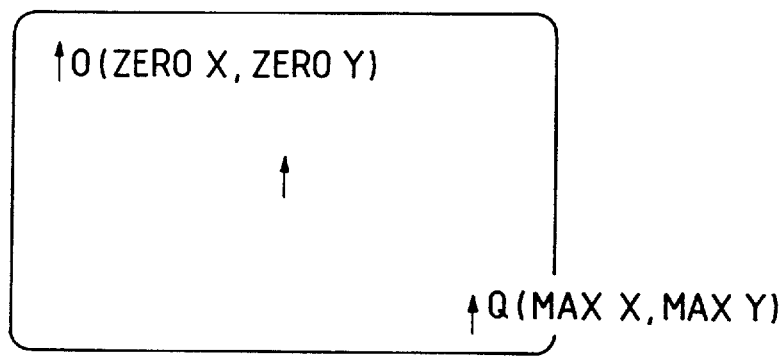
FIG. 7 is an explanatory drawing of a position correcting procedure of the processing circuit according to the present invention.
Figure 8:
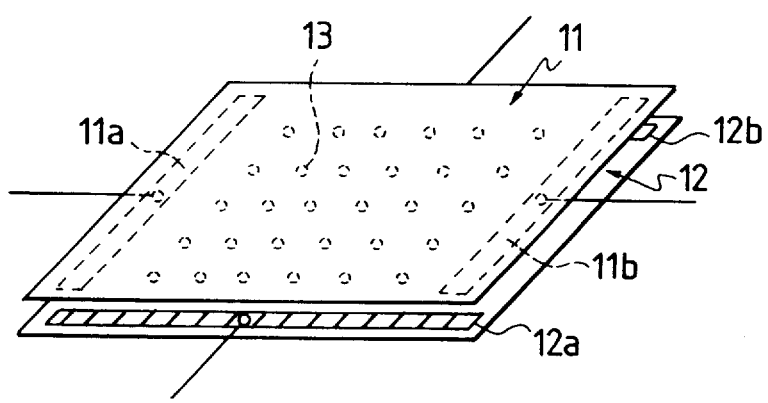
FIG. 8 is a perspective view showing the configuration of a conventional tablet.

FIG. 7 shows a method for correcting a position in a calibration mode for positional correction. When the calibration mode is executed, the cursor appears at top left (point 0) of the screen. By pressing the cursor, the data on point 0 (ZEROX, ZEROY) is obtained. Then the cursor appears at bottom right (point Q). By pressing the cursor, the data on point Q (MAXX, MAXY) is obtained. Then the cursor appears at the center of the screen, completing the calibration. The data (calibration data) obtained through this correction procedure, i.e., point 0 (ZEROX, ZEROY) and point Q (MAXX, MAXY) are saved in an EPROM 6, so that the data are saved even after the power is turned OFF. The subsequent arithmetic processing for determining the X-coordinate data, DATAX, and the Y-coordinate data, DATAY, is implemented using ZEROX, ZEROY, GAINX, which is a value obtained by dividing (MAXX-ZEROX) by a full-scale value (e.g., 1024) in the X-coordinate direction set by SW4 of the DIP switch 7, and GAINY, which is a value obtained by dividing (MAXY-ZEROY) by a full-scale value (e.g., 1024) in the Y-coordinate direction according to the formulas given below:

$$DATAX = (X - ZEROX) \times GAINX$$

$$DATAY = (Y - ZEROY) \times GAINY$$

The configuration described above enables the coordinate input apparatus to prevent detection of a position from being conducted before the two resistive films contact adequately and also prevent inaccurate detection of coordinates due to the chattering, which takes place when the electrodes contact, thus assuring highly accurate detection of a position.

I claim:
1. A coordinate input apparatus comprising:

a top substrate, which has a first resistive film formed on one surface thereof and which is provided with a first pair of electrodes on opposing parallel edges of said first resistive film, a bottom substrate, which has a second resistive film formed on one surface thereof, the second resistive film facing said first resistive film, and which is provided with a second pair of electrodes disposed on opposing parallel edges of said second resistive film and arranged orthogonally with respect to said first pair of electrodes, a spacer for spacing said first resistive film away from the second resistive film, wherein said spacer permits said first resistive film to contact said second resistive film when pressure is applied on said top substrate toward said bottom substrate, a determining means connected to one of the first and second pairs of electrodes for generating detection signals only when a resistance value caused by contact between said first and second resistive films exceeds a preset value larger than a normal contact resistance during a predetermined time period, and a controller for receiving positional data in an X coordinate from said first pair and said second pair of electrodes after receiving a first detection signal from said determining means, and for receiving positional data in a Y coordinate from said first pair and said second pair of electrodes after receiving a second detection signal from said determining means, and for providing the positional data in said X coordinate and said Y coordinate to a calculating circuit for calculating a positional coordinate indicating the position of the contact between said first resistive film and said second resistive film after receiving a third detection signal from said determining means, wherein said determining means comprises a comparator for comparing said preset value with said resistance value and for transmitting an input signal to said controller when said comparison indicates contact between said first and second resistive films.

2. A coordinate input apparatus according to claim 1, wherein the controller further comprises means for storing multiple positional data values received from said first and second pairs of electrodes, for calculating a difference between the multiple positional data values, and for causing calculation of coordinate information based on said positional data only when the calculated difference is less than a reference value.

* * * * *